Mar. 6, 1923.
H. FURSTE
NATURAL OBJECT BUILDER
Filed Dec. 15, 1920
1,447,379
2 sheets-sheet 1
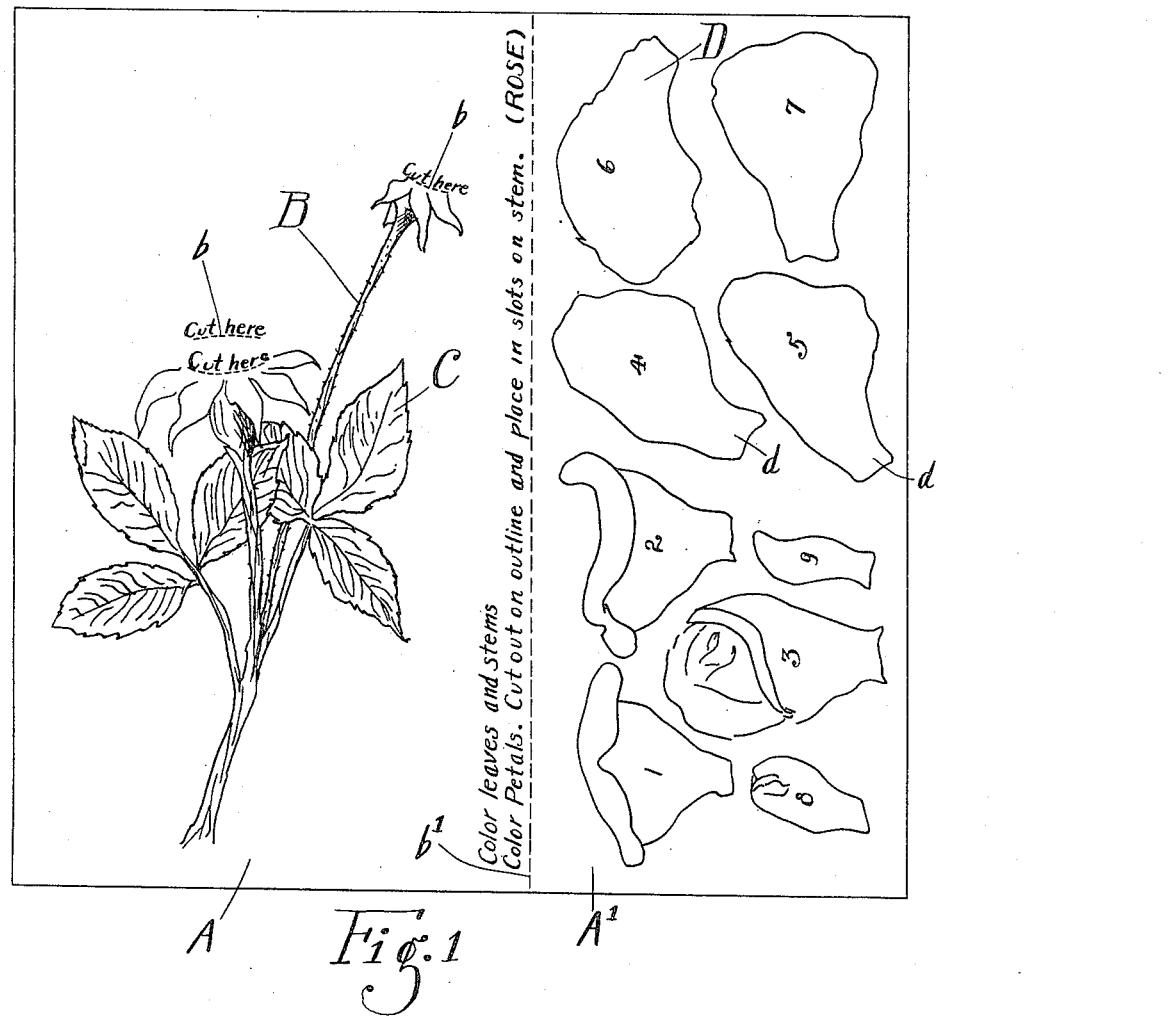

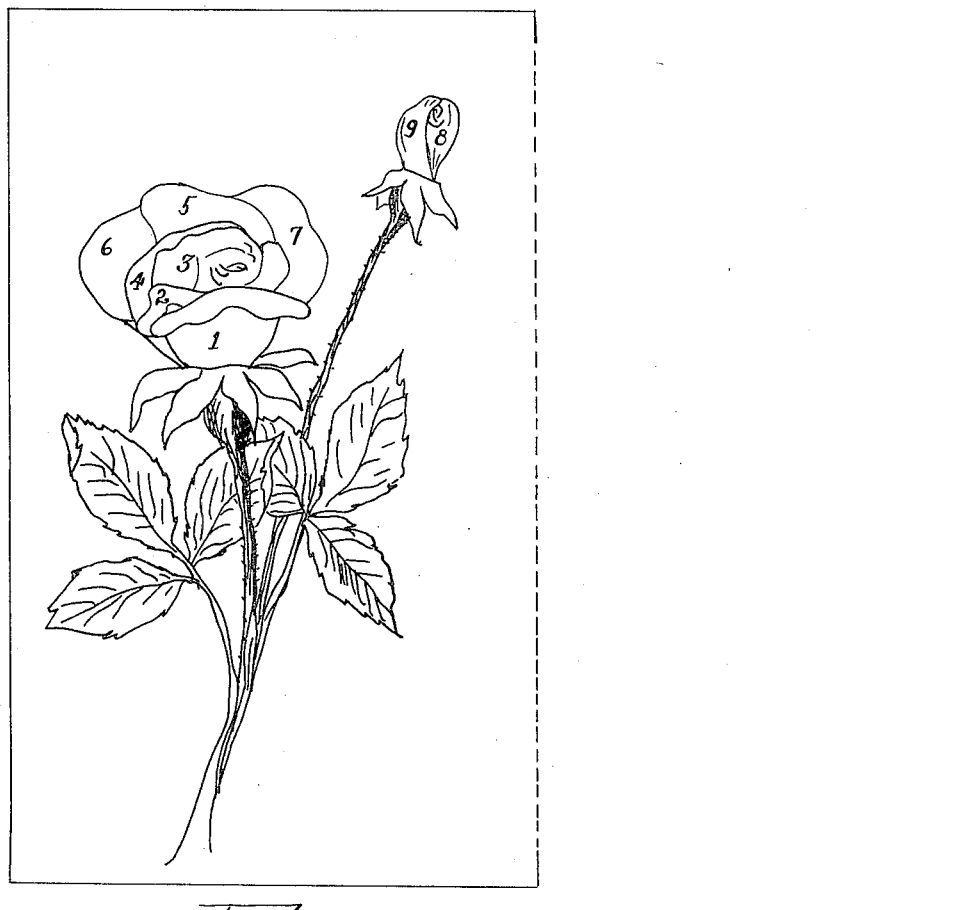

Patented Mar. 6, 1923.

1,447,379

UNITED STATES PATENT OFFICE.

HENRY FURSTE, OF CINCINNATI, OHIO.

NATURAL OBJECT BUILDER.

Application filed December 15, 1920. Serial No. 430,851.

*To all whom it may concern:*

Be it known that I, HENRY FURSTE, a citizen of the United States of America, and resident of Cincinnati, in the county of Hamilton and State of Ohio, have invented a new and useful Improvement in Natural Object Builders, of which the following is a specification.

An object of my invention is to provide an educational device for the instructive amusement of children.

Another object of this device is to present to children a series of disconnected parts of a given object, which may be colored by the child and then assembled into a single unit.

These and other objects are attained by the means described herein and disclosed in the accompanying drawing in which:—

Fig. 1 is a view of the article embodying my invention, in the form in which it is submitted to the child.

Fig. 2 is a view of my device after the child has colored, severed and assembled the parts.

My invention comprises a sheet of material having imprinted upon its primary section A some foundation of an object such as the stem, calyx, and leaves of a flower. Upon the other part or auxiliary section A' of the sheet are imprinted or designated in some other manner, the disconnected petals of a flower or bloom that together with the stem provide all the elements of the flower. The sheet is made of some incisable material such as paper or canvas, that may be readily cut by means of a scissors, and that is adapted to retain the colors or paints applied thereto. At the proper places upon sheet A adjacent to and about the stem B of the plant are imprinted or designated certain places *b* that are to be slitted or perforated. A child would take the sheet and would color the leaves C, the stem B, and the several petals D. The section A' may be severed from the primary portion A of the sheet along the line *b'* designated upon the sheet before or after coloring the several referred to parts. The child would then cut out the several petals, would perforate the sheet A along the lines *b*, and then insert the ends *d* of the petals thru the perforations formed along the lines *b* of the sheet A. The result would be a consolidated or composite stem and flower or bloom as shown in Fig. 2.

What I claim is:—

1. A new article of manufacture comprising a sheet of incisable material adapted to be colored and upon which is designated the foundation of an object, designated disconnected complementary elements of the object, and designated places of incision whereat the severed complementary elements may be mounted upon the sheet to form a composite object.

2. A new article of manufacture comprising a sheet of incisable material adapted to be colored and upon which is designated the foundation of an object, designated disconnected complementary elements of the object, the material having slots to receive parts of the complementary elements, whereby a composite object may be assembled upon the foundation.

3. A new article of manufacture comprising a sheet of incisable material adapted to be colored and having a primary and an auxiliary section, the primary section having designated thereon the foundation of an object and places of incision, and the auxiliary section having designated thereon the disconnected complementary elements of the object which may be severed from the auxiliary section and be inserted in slots made in the primary sheet whereby a composite object may be assembled upon the foundation.

4. A new article of manufacture comprising a sheet of incisable material adapted to be colored and having a primary and an auxiliary section, the primary section having designated thereon the foundation of an object and places of incision, and the auxiliary section having designated thereon the disconnected complementary elements of the objects which may be severed from the auxiliary section and be inserted in slots made in the primary sheet whereby a composite object may be assembled upon the foundation.

5. A new article of manufacture comprising a sheet of incisable material adapted to be colored and upon which is printed the representation of the stem, the calyx, slots to receive the petals, and outlines of the petals of a flower.

6. A new article of manufacture comprising a sheet of incisable material adapted to be colored and upon which is printed the representation of the stem, the calyx, slots to receive the petals, and outlines of the petals of a flower.

In testimony whereof, I have hereunto subscribed my name this 11th day of December, 1920.

HENRY FURSTE.